United States Patent [19]

Pinnell et al.

[11] Patent Number: 5,028,062
[45] Date of Patent: Jul. 2, 1991

[54] ALL PURPOSE DOLLY

[76] Inventors: David M. Pinnell, Rte. 7, Box 45; Clinton D. Weaver, 3372 Country Rd., both of Henderson, Tex. 75652

[21] Appl. No.: 468,084

[22] Filed: Jan. 22, 1990

[51] Int. Cl.⁵ .............................................. B62B 3/02
[52] U.S. Cl. ............................... 280/47.34; D34/17; D34/21; 280/2; 280/30; 280/47.35; 280/79.11; 280/790; 296/180
[58] Field of Search ............... 280/792, 790, 800, 107, 280/798, 799, 47.34, 47.35, 2, 79.11, 79.2, 79.6, 82, 86, 30, 79.3; 296/180, 3; D12/101; D34/17, 21

[56] References Cited

U.S. PATENT DOCUMENTS

| 1,655,668 | 1/1928 | Spurlock | 280/113 |
|---|---|---|---|
| 1,722,558 | 7/1929 | Clement | 280/2 |
| 2,862,720 | 12/1958 | Stone et al. | 280/30 |
| 2,893,961 | 7/1959 | Low | 280/47.26 |
| 3,021,011 | 2/1962 | Visneski | 211/49 |
| 3,210,091 | 10/1965 | Ng | 280/47.35 |
| 3,239,234 | 3/1966 | Henry | 280/2 |
| 3,860,252 | 1/1975 | Martens et al. | 280/2 |
| 3,883,005 | 5/1975 | Stevens | 280/30 |
| 4,264,081 | 4/1981 | Markham | 280/47.34 |
| 4,461,504 | 7/1984 | Perez et al. | 280/47.34 |

FOREIGN PATENT DOCUMENTS

| 813095 | 7/1951 | Fed. Rep. of Germany | 280/47.34 |
|---|---|---|---|
| 3631998 | 3/1988 | Fed. Rep. of Germany | 280/47.34 |
| 2043549 | 10/1980 | United Kingdom | 280/79.11 |

Primary Examiner—Andres Kashnikow
Assistant Examiner—Eric Culbreth
Attorney, Agent, or Firm—John M. Harrison

[57] ABSTRACT

An all purpose dolly which includes a dolly frame characterized by parallel horizontal frame members which extend downwardly and inwardly to define drop frame segments for supporting firewood, and vertical frame members upward-standing from the horizontal frame members and connected at the top to facilitate stacking the firewood upwardly on the dolly frame. A removable frame cover is seated on the vertical frame members and the dolly frame is fitted with a pivoting front axle and a fixed rear axle, with front and rear wheels mounted on the front and rear axles, respectively. A tongue extends from vertically pivotal attachment to the front axle for removably attaching the all purpose dolly to a tractor or other vehicle. A conversion panel is fitted with spaced guide rails for selectively and removably engaging the horizontal frame members and converting the all purpose dolly to a gardening and lawn dolly or the like.

4 Claims, 2 Drawing Sheets

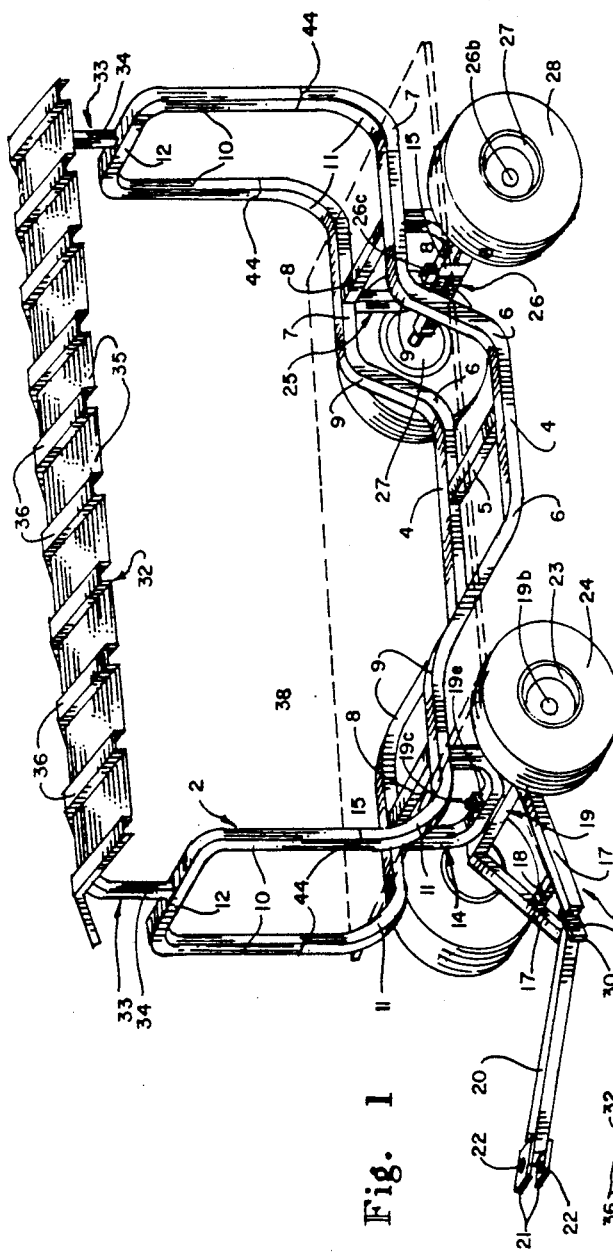
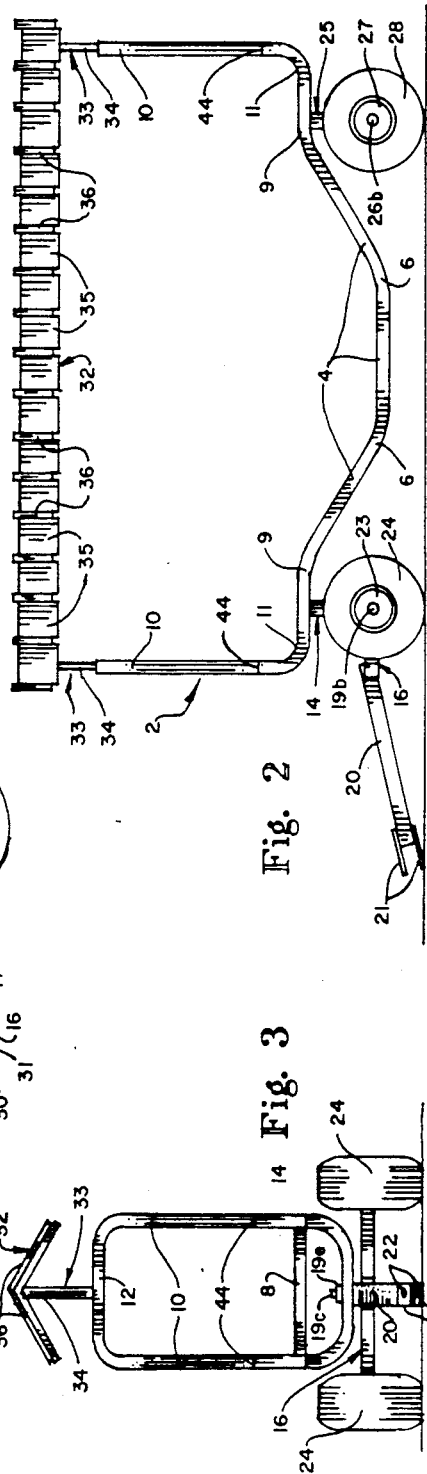
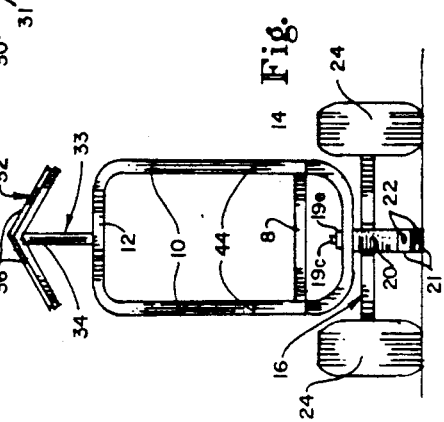
Fig. 1
Fig. 2
Fig. 3

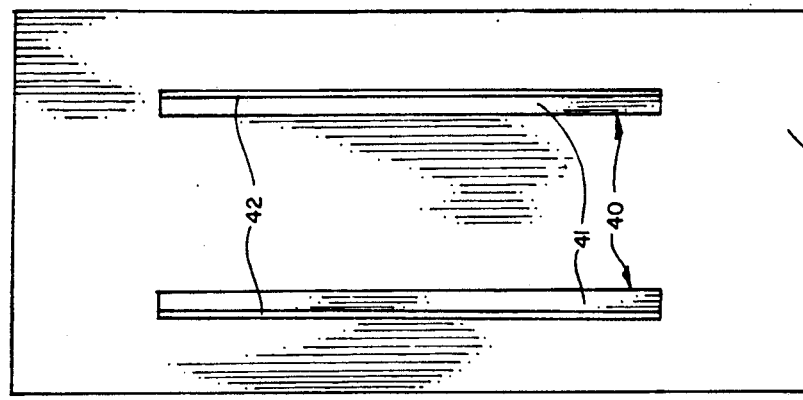
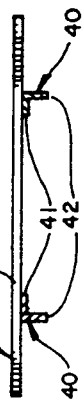
Fig. 6
Fig. 7
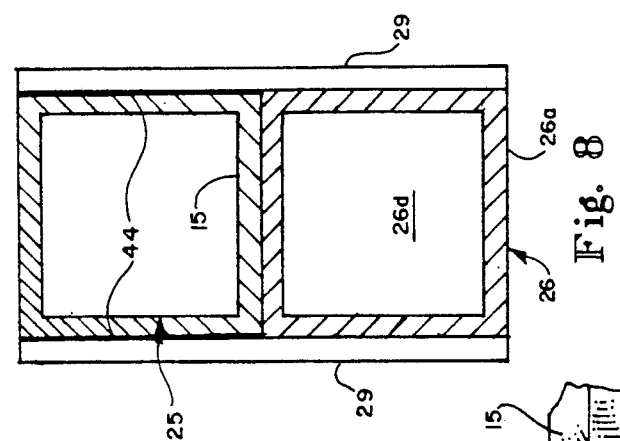
Fig. 8
Fig. 5
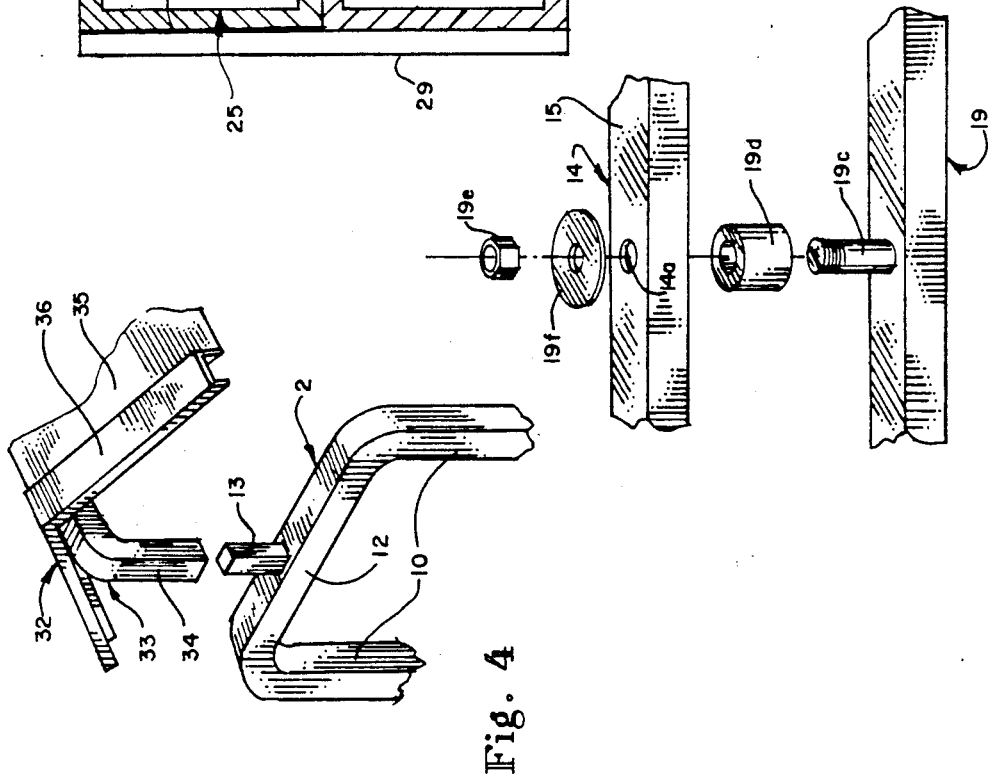
Fig. 4

ALL PURPOSE DOLLY

BACKGROUND OF THE INVENTION

1. Field of the Invention

This invention relates to firewood transportation, storage and relocation and more particularly, to an all purpose dolly which is characterized by a dolly frame having parallel horizontal members which are recessed in the center to define drop frame segments and vertical frame members attached to the horizontal frame members for stacking firewood on the dolly frame. Front and rear axles are fitted with front and rear wheels and a tongue is connected to the pivoting front axle for connecting the all purpose dolly to a tractor or other vehicle. A frame cover may be fixedly or removably attached to the upwardly-extending vertical frame members, in order to keep the firewood or alternative load dry. A conversion panel may be removably attached to the horizontal frame members when the all purpose dolly is empty, to convert the all purpose dolly to a gardening or lawn dolly, as desired.

One of the problems which is realized in the use of stationary firewood racks or supports is that of periodically moving the racks or supports for cleaning purposes or to an alternative storage location. Bits of wood, sawdust, dust and other debris accumulate beneath the typical firewood rack or support after firewood is stored thereon. Since the rack or support is not normally fitted with rollers, casters or wheels, it is difficult to move, especially with the firewood in place, and cleaning behind and beneath the firewood rack or support is usually difficult or impossible. This lack of sanitation facilitates the development of ant beds and encourages mice and rats to inhabit the firewood or the area beneath or behind the firewood and the elimination of these pests cannot normally be undertaken until the firewood is either burned or removed from the rack and the rack is moved from its original location.

2. Description of the Prior Art

Various types of firewood racks and supports are known in the art. Typical of these supports is the "Mobile Log Caddy" detailed in U.S. Pat. No. 2,896,961, dated July 28, 1959, to P. H. Low. The mobile log caddy includes a circular frame having a handle and a bottom panel for receiving firewood, with a set of wheels provided on the frame beneath the circular firewood support section. The mobile log caddy is designed to receive and store a limited supply of firewood and is capable of being rolled from one location to the other. A "Fireplace Implement by Which Firewood is Hauled To and Stored Juxtaposed the Fireplace" is detailed in U.S. Pat. No. 4,264,081, dated Apr. 28, 1981, to Donald A. Markham. The fireplace implement includes a cart having open sides, fore and aft frames and handle members bridging the tops of the fore and aft frames. The cart is provided with four wheels at the bottom thereof, such that a load of firewood can be stacked between the fore and aft frames and rolled from place-to-place. U.S. Pat. No. 3,860,252, dated Jan. 14, 1975, to Gus H. Martenes, et al, details a "Low Center of Gravity Trailer". The low center of gravity trailer is designed to support a horizontal tank and to carry heavy loads over rough ground without the danger of tipping. The trailer includes an underslung frame supported on a transverse beam carrying rear wheels on the outer ends thereof. The frame is upwardly offset at the forward portion and is supported by a pair of steerable front wheels which are mounted on an axle that can pivot about a horizontal longitudinal pivot, to permit the front wheels to adjust to ground conditions without twisting the frame. A "Drop Frame Trailer" is detailed in U.S. Pat. No. 1,722,558, dated July 30, 1929, to C. G. Clement. The drop frame trailer includes a frame having a lowered center section to receive a hopper on curved channels and facilitate tipping of the hopper body for pouring out the contents of the hopper. U.S. Pat. No. 3,021,011, dated Feb. 13, 1962, to V. N. Visneski, discloses another "Firewood Rack". The firewood rack is characterized by a rectangular plate fitted with a bottom frame having casters thereon and a top frame having upward-standing members for receiving and containing a supply of firewood. U.S. Pat. No. 1,655,666, dated Jan. 10, 1928, to M. Spurlock, details a "Land Vehicle" which includes a U-shaped frame having a recessed center section and fitted with wheels, for picking cotton. A "Low Bed Agricultural Trailer" is detailed in U.S. Pat. No. 3,239,234, dated Mar. 8, 1966, to D. G. Henry. The agricultural trailer is fitted with four wheels and upward-standing ends for receiving a supply of cotton, hay or the like.

It is an object of this invention to prOvide an all purpose dolly which is characterized by a pair of horizontal frame members depressed in the center thereof to define drop frame segments and terminated at opposite ends by upward-standing vertical frame members for receiving, stacking and storing firewood.

Another object of the invention is to provide an all purpose dolly which includes a frame fitted with parallel horizontal members spaced by spacer members, each of the horizontal members having a dropped center section and terminated by parallel, upward-standing vertical frame members and wheels located at each end of the frame, with one set of wheels pivoted with respect to the frame and fitted with a pivoting tongue for connecting the dolly to a tractor or other vehicle for transportation purposes.

A still further object of the invention is to provide an all purpose dolly which is characterized by a dolly frame having a recessed center section and spaced, upward-standing end members for receiving, stacking and storing a supply of firewood, the frame further provided with front and rear wheels, the front set of wheels having a pivoting tongue and a hitch device for attaching the dolly to a tractor or other vehicle and further including a top mounted on the upward-standing end members for protecting the firewood from the elements.

A still further object of the invention is to provide an all purpose dolly which includes a pair of horizontally spaced horizontal frame members having parallel, downwardly-extending dropped center section segments and terminated at each end by parallel, upward-standing vertical members for receiving and stacking firewood; front and rear sets of wheels mounted on the horizontal frame segments, with the front set of wheels pivotally mounted thereon; and further including a vertically pivoting tongue having a hitch mechanism for attaching the dolly to a tractor or other vehicle. A conversion panel is also provided for seating on the horizontal frame members and converting the dolly to an all purpose vehicle for gardening and the like.

SUMMARY OF THE INVENTION

These and other objects of the invention are provided in a new and improved all purpose dolly which is characterized in a first preferred embodiment by parallel, horizontal frame members spaced by spacer segments, the horizontal frame members having parallel, connected lowered center segments and terminated at each end by upward-standing vertical frame members which are connected at the top, for receiving, storing and transporting a load of firewood; front and rear axles attached to the frame for receiving wheels, the front axle of which is pivoted with respect to the frame; and an elongated, vertically pivoting tongue provided with a hitch for attaching the dolly to a tractor or other vehicle. In a second preferred embodiment of the invention the all purpose dolly is further characterized by a removable top which is attached to the upward-standing vertical frame members for protecting the firewood from the elements. In a third preferred embodiment of the invention a flat conversion panel is adapted for seating on the horizontal frame members and converting the all purpose dolly to a lawn and gardening vehicle or the like.

BRIEF DESCRIPTION OF THE DRAWINGS

The invention will be better understood by reference to the accompanying drawings, wherein:

FIG. 1 is a perspective view of a preferred embodiment of the all purpose dolly of this invention;

FIG. 2 is a side view of the all purpose dolly illustrated in FIG. 1;

FIG. 3 is a front end view of the all purpose dolly illustrated in FIGS. 1 and 2;

FIG. 4 is an exploded view of one end of a preferred mount for the removable top illustrated in the all purpose dolly illustrated in FIGS. 1-3;

FIG. 5 is an exploded view of a preferred mount for the front axle assembly of the all purpose dolly illustrated in FIGS. 1-3;

FIG. 6 is a bottom view of a conversion panel which may be used with the all purpose dolly illustrated in FIGS. 1-3;

FIG. 7 is an end view of the conversion panel illustrated in FIG. 6; and

FIG. 8 is a sectional view of the rear axle of the all purpose dolly, taken along line 8—8 in FIG. 1.

DESCRIPTION OF THE PREFERRED EMBODIMENTS

Referring initially to FIGS. 1-3 of the drawings, the all purpose dolly of this invention is generally illustrated by reference numeral 1. The all purpose dolly 1 is characterized by a dolly frame 2 which is shaped to define parallel, horizontal frame members 7, that extend downwardly at the horizontal frame bends 9 and again horizontally at the drop frame bends 6, respectively, to define parallel horizontal drop frame segments 4. A drop frame spacer 5 spaces the parallel drop frame segments 4, to connect the horizontal frame members 7 in the center thereof. Similarly, horizontal frame spacers 8 space and connect the parallel horizontal frame members 7 near the ends of the horizontal frame members 7, to impart additional rigidity to the dolly frame 2. A pair of vertical frame members 10 extend upwardly from the horizontal frame members 7, respectively, at parallel vertical frame bends 11, located on each end of the horizontal frame members 7, respectively, as further illustrated in FIG. 1. The top ends of the vertical frame members 10 are curved toward each other and join to define a pair of connecting segments 12, in order to complete the unitary dolly frame 2, which is capable of receiving a supply of stacked firewood (not illustrated). In a preferred embodiment of the invention each of the vertical frame members 10 are constructed in two segments, with the lower portions shaped to define the respective horizontal frame members 7, including the drop frame segments 4 and end portions projecting upwardly from the vertical frame bends 11, respectively. The upper, U-shaped portions, including the connecting segments 12, are welded to the end portions at the welds 44, respectively. Connecting stubs 13 extend upwardly from the spaced connecting segments 12 of the vertical frame members 10, respectively, to receive the corresponding downwardly-extending, spaced mount bar legs 34 of a cover mount bar 33 and removably mount the frame cover 32 on the dolly frame 2. The frame cover 32 is further characterized by an inverted V-shaped cover sheeting 35, bolted or otherwise secured to the cover mount bar 33, and provided with spaced sheeting ribs 36 shaped in the cover sheeting 35, in order to cover and protect the firewood 45 from inclement weather. In a most preferred embodiment of the invention the frame cover 32 is shaped to define a ridge 37 to better facilitate shedding of water.

Referring now to FIGS. 1 and 5, in another most preferred embodiment of the invention a front axle mount 14 is secured to one end of the horizontal frame members 7 at the horizontal frame spacers 8 and includes an axle mount segment 15, which is attached to a front axle 19 by means of a threaded axle pin 19c, which projects through a mount aperture 14a, provided in the axle mount segment 15. A tongue yoke 16 is characterized by a pair of side yoke members 17, each having one end welded or otherwise secured to the front axle 19 in spaced relationship and the opposite end welded or otherwise attached to a pivot plate 30. The pivot plate 30 receives one end of a tongue 20 by means of a pivot pin 31 and the opposite end of the tongue 20 is provided with a pair of horizontally-spaced, parallel hitch bars 21, fitted with vertically aligned bar apertures 22, for receiving a corresponding hitch pin (not illustrated) and connecting the tongue 20 to a tractor or other vehicle (not illustrated). A side yoke brace 18 connects the side yoke members 17 as illustrated in FIG. 1, in order to further brace the tongue yoke 16. The front axle 19 is further characterized by an axle housing 19a, which internally receives an axle bar 19b. A pair of front rims 23 are rotatably mounted on the extending ends of an axle bar 19b and front tires 24 are mounted on the front rims 23, in conventional fashion.

Referring to FIGS. 1, 5 and 8, a rear axle mount 25 is secured to the opposite ends of the horizontal frame members 7 at the opposite horizontal frame spacer 8, as illustrated in FIG. 1. Like the front axle mount 14, the rear axle mount 25 is shaped to define an axle mount segment 15 and the rear axle mount 25 is secured to the rear axle housing 26a of the rear axle 26 by means of a threaded rear axle pin 26c. A rear axle bar 26b is welded or shaped integrally with a rear axle plug 26d, which is inserted and welded in each end of the rear axle housing 26a as illustrated in FIG. 8 and each rear axle bar 26b rotatably receives a rear rim 27, respectively. Rear tires 28 are mounted on the rear rims 27 in conventional fashion, as illustrated in FIG. 1. The front axle bars 19b are mounted in the front axle housing 19 in similar fashion. Alignment tabs 29 are welded at the welds 44, or otherwise secured to the rear axle housing 26a, in order to maintain alignment of the rear axle mount 25 with the rear axle housing 26a and further secure the rear axle 26 to the rear axle mount 25, as further illustrated in FIG. 8.

From a consideration of FIGS. 1-3 of the drawings, it will be appreciated by those skilled in the art that the all purpose dolly 1 is capable of receiving, transporting and storing firewood in stacked configuration on the dolly frame member 2 such that the parallel drop frame segments 4 operate to create a low center of gravity for the all purpose dolly 1. This location of the firewood on the dolly frame 2 facilitates relocation of the all purpose dolly 1 with a full load of firewood over uneven terrain without upsetting or overturning the all purpose dolly 1 and spilling the firewood. Furthermore, the frame cover 32 is capable of being easily removed from the dolly frame 2, if necessary. Alternatively, the cover mount bars 33 may be welded or otherwise attached directly to the segment stubs 13 of the connecting segments 12, respectively, for permanently mounting the frame cover 32 to the dolly frame 2.

Referring now to FIGS. 1, 6 and 7 of the drawings, a conversion panel is generally illustrated by reference numeral 38 and includes a flat, rectangular-shaped panel platform 39, fitted with a pair of parallel, spaced guide rails 40 on one side thereof. In a preferred embodiment of the invention the guide rails 40 are each characterized by a length of angle iron having a platform flange 41 which is bolted or otherwise attached directly to the panel platform 39 and a guide flange 42 which extends outwardly from the platform flange 40 for engaging the parallel horizontal frame members 7, respectively, when the conversion panel 38 is seated on the dolly frame 2 of the all purpose dolly 1, as illustrated in phantom in FIG. 1. Mount cleats or other mounting devices (not illustrated) may be attached to the panel platform 39 in spaced relationship at each end of the guide rails 40, in order to removably seat the panel platform 39 on the horizontal frame members 7 by engaging the parallel horizontal frame spacers 8, as deemed necessary. Otherwise, the conversion panel 38 is seated on the horizontal frame members 7 as illustrated in phantom in FIG. 1, without attachment to the dolly frame 2.

It will be appreciated by those skilled in the art that the all purpose dolly of this invention is designed primarily for the purpose of receiving, transporting, storing, protecting and accessing firewood, wherein the firewood can be easily moved from one location to another by hitching the all purpose dolly 1 to a tractor or other vehicle at the hitch bars 21, without spilling the firewood or overturning the all purpose dolly 1. The facility for maintaining the firewood on the dolly frame 2 of the all purpose dolly 1 is enhanced by the drop frame segments 4, which lower the center of gravity of the all purpose dolly 1 and facilitate stable movement of the all purpose dolly 1 over irregular terrain. This facility is aided by the large pneumatic front tires 24 and rear tires 28. Furthermore, in the spring, summer and fall of the year, the conversion panel 38 can be seated on the empty dolly frame 2 as illustrated in phantom in FIG. 1, and used to transport bags of fertilizer, peat moss, plants and the like, to facilitate using the all purpose dolly 1 for lawn and gardening and purposes other than firewood storage. Since the all purpose dolly 1 is mobile and can be easily rolled from place to place, it has wide utility for household use on the patio or in the yard. Further-more, it will be appreciated by those skilled in the art that the all purpose dolly 1 can be built to any desired specifications and size, depending upon the quantity of firewood to be stored and the desired specifications for use with an existing tractor and conversion panel 38 of suitable size. It will also be appreciated that while various components of the dolly frame 2, including the horizontal frame members 7, drop frame spacer 5, horizontal frame spacers 8, front axle 19 and rear axle 26 are constructed of square box tubing, round tubing or the like may also be used, according to the knowledge of those skilled in the art. Furthermore, the side and expanse of the frame cover 32 may be varied, depending upon the desired coverage and protection required for the firewood or other contents of the all purpose dolly 1, as desired. It will be further understood that while the parallel hitch bars 21 are provided on the extending end of the tongue 20 for receiving a pin (not illustrated) in order to secure the tongue 20 to a tractor or other vehicle, any desired trailer hitch device can be utilized, further according to the knowledge of the skilled artisan.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An all purpose dolly comprising a pair of horizontal frame members disposed in spaced, horizontal, substantially parallel relationship; a pair of recessed drop frame segments provided in said horizontal frame segments in spaced, substantially parallel relationship, respectively, said drop frame segments defining a lowered center section in said horizontal frame members, respectively; at least one spacer spacing said horizontal frame members and said drop frame segments; a pair of vertical frame members extending upwardly in spaced, substantially parallel relationship from the opposite ends of said horizontal frame members, respectively; a connecting segment connecting each of said pair of vertical frame members; a stub upward-standing from said connecting segment in spaced relationship, cover means disposed over said horizontal frame members and said vertical frame members, a cover mount bar carried by said cover means and a mount bar leg extending downwardly from each end of said cover mount bar for removably engaging said stub, respectively, and removably supporting said cover means on said vertical frame members; a front axle pivotally spanning one end of said horizontal frame members, a tongue having one end attached to said front axle and a pair of front wheels rotatably mounted on said front axle; hitch means provided on the opposite end of said tongue for connecting said tongue to a towing vehicle; and a rear axle fixedly spanning the opposite end of said horizontal frame segments and a pair of rear wheels rotatably mounted on said rear axle, for rolling said all purpose dolly from place to place.

2. The all purpose dolly of claim 1 wherein said hitch means further comprises a pair of horizontally disposed bars attached to said opposite end of said tongue in spaced relationship and apertures provided in said hitch bars in vertically registering relationship.

3. The all purpose dolly of claim 1 further comprising conversion panel means adapted for resting on said horizontal frame members in removable relationship.

4. The all purpose dolly of claim 1 further comprising a conversion panel having a pair of guide rails for engaging said horizontal frame members and stabilizing said conversion panel when said conversion panel is positioned on said horizontal frame members in removable relationship.

* * * * *